United States Patent [19]

Mülhaupt et al.

[11] Patent Number: 5,135,986
[45] Date of Patent: Aug. 4, 1992

[54] STABILIZED STYRENE COPOLYMERS CONTAINING ELASTOMER PARTICLES

[75] Inventors: Rolf Mülhaupt, Marly, Switzerland; Bernard Gilg, St. Louis-La-Chaussée, France; Gerhard Rytz, Schwarzenburg; Mario Slongo, Tafers, both of Switzerland

[73] Assignee: Ciba-Geigy Corporation, Ardsley, N.Y.

[21] Appl. No.: 742,175

[22] Filed: Aug. 1, 1991

Related U.S. Application Data

[63] Continuation of Ser. No. 588,506, Sep. 25, 1990, abandoned, which is a continuation of Ser. No. 346,775, May 3, 1989, abandoned, which is a continuation of Ser. No. 335,470, Apr. 10, 1989, abandoned.

[30] Foreign Application Priority Data

Apr. 15, 1988 [CH] Switzerland .................. 1402/88-9

[51] Int. Cl.⁵ .................................. C08F 279/02
[52] U.S. Cl. .................................. 525/279; 525/310; 525/316
[58] Field of Search .......................... 525/279

[56] References Cited

U.S. PATENT DOCUMENTS

| | | | |
|---|---|---|---|
| 3,557,254 | 1/1971 | Bauer | 525/279 |
| 4,110,304 | 8/1978 | Gilg et al. | |
| 4,210,612 | 7/1980 | Karrer | |
| 4,312,961 | 1/1982 | Winegar | 524/350 |
| 4,354,007 | 10/1982 | Scott | 525/279 |
| 4,376,797 | 3/1983 | Howse | 427/302 |
| 4,743,657 | 5/1988 | Rekers | 525/279 |

OTHER PUBLICATIONS

Atmospheric Oxidation and Antioxidants by Gerald Scott (1965).
Encyclopedia of Chemical Technology, Kirk-Othmer, pp. 840, 91, 373, 130, 129, 128 (1984).
Malaika et al. Degradation and Stabilization of Polyolefins, Elsevier Applied Science Publishers, Ltd. London, pp. 304–307 (1983).
Polymer Photochemistry, vol. 2 (1982) pp. 175–179 & 202–205.
Encyclopedia of Polymer Science and Engineering, vol. 1. pp. 388–426 (1985).
Ullmans Encyclopedia of Industrial Chem., Verlag Chemie, vol. 19, pp. 277–295 (1980).
European Polymers J., vol. 13, p. 982 (1977).

Primary Examiner—James J. Seidleck
Assistant Examiner—Vasu S. Jagannathan
Attorney, Agent, or Firm—JoAnn Villamizar

[57] ABSTRACT

Copolymers of styrene or a-methylstyrene and at least one comonomer, containing crosslinked elastomer particles, can be light-stabilized by modifying the elastomer particles by copolymerization with a suitable derivative of a sterically hindered amine. The modification is preferably carried out by graft polymerization, the elastomer used preferably being polybutadiene.

19 Claims, No Drawings

STABILIZED STYRENE COPOLYMERS CONTAINING ELASTOMER PARTICLES

This application is a continuation, of application Ser. No. 588,506, filed Sep. 25, 1990, now abandoned, which is a continuation, of application Ser. No. 346,775, filed May 3, 1989 which is a continuation-in-part of Ser. No. 335,470 filed Apr. 10, 1989; now abandoned.

The invention relates to light-stabilized copolymers of styrene or α-methylstyrene and at least one comonomer, which contain crosslinked elastomer particles.

Styrene copolymers which contain elastomer particles are known in the form of thermoplastics having high impact strength. These are preferably graft copolymer. They consist of a thermoplastic styrene copolymer matrix which contains crosslinked elastomer particles as disperse phase, the copolymer grafted onto the elastomer particles imparting a phase structure. These styrene copolymers are prepared by subjecting slightly crosslinked elastomer particles to graft polymerization with styrene and one or more comonomers. The slightly crosslinked elastomer particles can be prepared by mass phase inversion or by emulsion polymerization. Examples of suitable elastomers are polybutadiene, butadiene/acrylonitrile or butadiene/styrene copolymers, ethylene/propylene/diene terpolymers and acrylate elastomers, for example polybutyl acrylate and its copolymers.

Graft copolymers of styrene/acrylonitrile on polybutadiene are referred to as ABS polymers, and graft copolymers of styrene/methyl methacrylate on polybutadiene are referred to as MBS polymers. In addition to these two most important types, other styrene copolymers having elastomer phases have also been disclosed, as well as their polymer blends with styrene copolymers or other thermoplastics. In this context, see Encyclopedia Polymer Sci. Engng., J. Wiley 1985, Vol. 1, pages 388-426; Ullmanns Encyclop. d. techn. Chemie (Ullmans Encyclopedia of Industrial Chemistry), Verlag Chemie 1980; Volume 19, pages 277-295.

Plastics of the ABS or MBS type are engineering thermoplastics which are used in large amounts, for example in the production of household appliances, electrical appliances or sports equipment and of automotive parts. For use outdoors, these polymers have to be stabilized to light and oxygen. It is known that elastomer/styrene graft copolymers rapidly age and thus become brittle. For example, when ABS polymers were exposed to UV light, disappearance of the double bonds in the polybutadiene phase and at the same time embrittlement of the polymer were observed, leading finally to the loss of impact strength (G. Scott and M. Tahan, Eur. Polym. J. 13 (1977) 982).

For stabilization, antioxidants and light stabilizers are added to these polymers. The light stabilizers used today are, above all sterically hindered amines, in particular in combination with UV absorbers. Such combinations are recommended, for example in DE-A-2 417 535, for all types of styrene copolymers. This constitutes stabilization by the addition of light stabilizers (physical mixture).

In EP-A-496, copolymers of unsaturated derivatives of sterically hindered amines with other monomers have also already been described. These copolymers have a high content of sterically hindered amines and can be used as polymeric light stabilizers.

U.S. Pat. No. 4,743,657 describes the preparation of polymeric stabilizers by grafting unsaturated stabilizers on polymers, for example on polypropylene.

In the search for improved light stabilization for elastomer/styrene graft copolymers, an attempt was made to incorporate unsaturated derivatives of sterically hindered amines by copolymerization. It was found, surprisingly, that incorporation into the elastomer phase of such graft copolymers results in particularly high efficiency.

The invention therefore relates to light-stabilized copolymers of styrene or α-methylstyrene and at least one comonomer, containing cross-linked elastomer particles, which are modified by copolymerization with an unsaturated derivative of a sterically hindered amine.

These are preferably graft copolymers of styrene or α-methylstyrene and at least one comonomer on the modified crosslinked elastomer.

The comonomer may be any polymerizable unsaturated compound, for example an acrylic acid, methacrylic acid or maleic acid derivative or a styrene derivative. The comonomer is preferably acrylonitrile or methyl methacrylate. It is also possible to use two comonomers, for example mixtures of acrylonitrile and methyl methacrylate or mixtures of acrylonitrile or methyl methacrylate with small amounts of vinyl acetate, butyl acrylate or maleates.

The copolymers are preferably copolymers of styrene and acrylonitrile or styrene and methyl methacrylate.

The elastomer may be any elastomer which is suitable for graft copolymerizations. Examples of these are polybutadiene, butadiene/acrylonitrile copolymers, butadiene/styrene copolymers, ethylene/propylene/diene terpolymers or polybutyl acrylate and its copolymers. The elastomer is preferably polybutadiene. The preparation of these elastomer particles is carried out by known processes, for example by mass polymerization or suspension polymerization, but in particular by emulsion polymerization. The elastomer particles are slightly crosslinked and generally have a mean diameter of from 0.1 to 50 lm, preferably from 0.5 to 20 lm.

The elastomer is modified with the sterically hindered amine by copolymerization. The copolymerization can be carried out during the preparation of the elastomer or as graft copolymerization onto the crosslinked elastomer. Grafting with the sterically hindered amine can be effected simultaneously with grafting with the styrene/comonomer mixture. The process is preferably carried out in two steps, by first grafting the unsaturated derivative of the sterically hindered amine and then the styrene/comonomer mixture. The graft polymerization is preferably carried out in emulsion.

A copolymerizable unsaturated derivative of 2,2,6,6-tetramethylpiperidine is preferably used as the unsaturated derivative of a sterically hindered amine. Here, the unsaturated group may be in a substituent in the 4-position and/or 1-position of the piperidine ring. Examples of unsaturated groups are, in particular, acryloyl and methacryloyl groups, as well as maleic acid groups, vinyl ether groups and allyl ether groups, allylamino groups or crotonyl groups.

The copolymerization with the elastomer is preferably carried out using a compound of the formula I

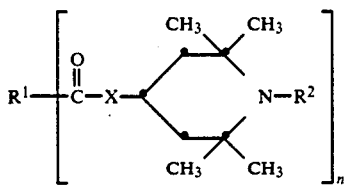

in which n is 1 or 2 and X is —O— or —N(R$^3$)—, R$^1$, where n=1, is $C_1$-$C_{18}$alkyl, $C_2$-$C_5$alkenyl, $C_5$-$C_8$cycloalkyl, $C_7$-$C_9$-phenylalkyl, phenyl, phenyl which is substituted by halogen, $C_1$-$C_4$alkyl or $C_1$-$C_4$alkoxy, or a group R$^4$OOC—CH=CH— or, where n=2, $C_2$-$C_{10}$alkylene, vinylene, $C_6$-$C_{12}$arylene or cyclohexylene, R$^2$ is hydrogen, $C_1$-$C_{12}$alkyl, $C_3$-$C_5$alkenyl, $C_7$-$C_9$-phenylalkyl, $C_2$-$C_{10}$alkanoyl, $C_3$-$C_6$alkenoyl or a group of the formula III

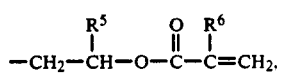

R$^3$ is hydrogen, $C_1$-$C_{12}$alkyl or $C_5$-$C_8$cycloalkyl,
R$^4$ is hydrogen or $C_1$-$C_{12}$alkyl,
R$^5$ is hydrogen, CH$_3$ or CN and
R$^6$ is hydrogen, $C_1$-$C_{12}$alkyl or phenyl,
at least one of the substituents R$^1$ and R$^2$ containing an ethylenic double bond.

The compounds of the formula II

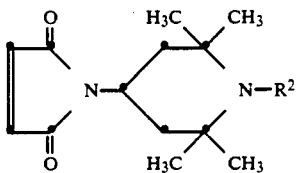

in which R$^2$ is hydrogen, $C_1$-$C_{12}$alkyl, $C_3$-$C_5$alkenyl, $C_7$-$C_9$phenylalkyl or $C_2$-$C_{10}$alkanoyl, are also preferably used.

Among the compounds of the formula I, the following are preferred:

a) those in which n is 1, X is —O—, R$^1$ is $C_2$-$C_5$alkenyl and R$^2$ is hydrogen, $C_1$-$C_4$alkyl, allyl, benzyl or acetyl, b) those in which n is 1 or 2, X is —O—, R$^1$, where n=1, is $C_1$-$C_{18}$-alkyl, cyclohexyl or phenyl and, where n=2, is $C_2$-$C_8$alkylene, and R$^2$ is $C_3$-$C_6$alkenoyl, and c) those in which n is 1, X is —O—, R$^1$ is $C_2$-$C_5$alkenyl and R$^2$ is a group of the formula III, where R$^5$ and R$^6$ are hydrogen or CH$_3$.

In these formulae, alkyl radicals R$^1$, R$^2$, R$^3$, R$^4$ and R$^6$ may be straight-chain or branched. Examples of these are methyl, ethyl, n-propyl, isopropyl, n-butyl, sec-butyl, tert-butyl, isopentyl, n-hexyl, n-octyl, 2-ethylhexyl, n-decyl, isoundecyl or n-dodecyl. Alkyl radicals R$^1$ can also be, for example, tetradecyl, hexadecyl or octadecyl.

$C_2$-$C_5$alkenyl radicals R$^1$ can be, for example, vinyl, propenyl, isopropenyl, butenyl or pentenyl, in particular vinyl and 2-propenyl (isopropenyl). The preferred $C_3$-$C_5$alkenyl radical R$^2$ is allyl.

$C_5$-$C_8$cycloalkyl radicals R$^1$ and R$^3$ can be, for example, cyclopentyl, cyclohexyl or cyclooctyl, but in particular cyclohexyl.

$C_7$-$C_9$phenylalkyl radicals R$^1$ and R$^2$ can be, for example, benzyl, phenylethyl or phenylpropyl, but in particular benzyl.

$C_2$-$C_{10}$alkanoyl radicals R$^2$ can be, for example, acetyl, propionyl, butyroyl, isobutyroyl, n-pentanoyl, tert-pentanoyl, hexanoyl, octanoyl or isodecanoyl, but in particular acetyl. A $C_3$-$C_6$alkenoyl radical R$^2$ is, in particular, acryeoyl or methacryloyl.

$C_2$-$C_{10}$alkylene radicals R$^1$ can be, for example, di-, tri-, tetra-, hexa-, octa- or decamethylene, 2,2-dimethyltrimethylene or 1,3,3-trimethyltetramethylene.

$C_6$-$C_{12}$arylene radicals R$^1$ can be, for example, phenylene, naphthylene or diphenylene, in particular phenylene.

All compounds of the formulae I and II contain at least one ethylenic double bond, which makes the compound capable of undergoing copolymerization. However, the compounds can also contain two double bonds. Such compounds are preferably copolymerized during the preparation of the elastomer.

Examples of compounds of the formula I are:
1,2,2,6,6-pentamethyl-4-piperidinyl acrylate, methacrylate or crotonate,
2,2,6,6-tetramethyl-4-piperidinyl acrylate, methacrylate or crotonate,
1-allyl-2,2,6,6-tetramethyl-4-piperidinyl acrylate, methacrylate or crotonate,
1-benzyl-2,2,6,6-tetramethyl-4-piperidinyl acrylate, methacrylate or crotonate,
N-(2,2,6,6-tetramethyl-4-piperidinyl)-acrylamide,
N-methyl-N-(1,2,2,6,6-pentamethyl-4-piperidinyl)-methacrylamide,
N-butyl-N-(1,2,2,6,6-pentamethyl-4-piperidinyl)-acrylamide,
Monoethyl mono(1,2,2,6,6-pentamethyl-4-piperidinyl) maleate,
Di(2,2,6,6-tetramethyl-4-piperidinyl) fumarate,
Monohexyl maleate N-(2,2,6,6-tetramethyl-4-piperidinyl)-N-butylamide,
N,N'-di(1,2,2,6,6-pentamethyl-4-piperidinyl)-N,N'-dibutylmaleic acid diamide,
1-Acryloyl-2,2,6,6-tetramethyl-4-acetoxypiperidine,
1-Methacryloyl-2,2,6,6-tetramethyl-4-butyroyloxypiperidine,
1-Crotonyl-2,2,6,6-tetramethyl-4-benzoyloxypiperidine,
1-Acryloyl-2,2,6,6-tetramethyl-4-acryloyloxypiperidine,
1-Methacryloyl-2,2,6,6-tetramethyl-4-methacryloyloxypiperidine,
1-Acryloyl-2,2,6,6-tetramethyl-4-(4-chlorobenzoyloxy)piperidine,
Di(1-acryloyl-2,2,6,6-tetramethyl-4-piperidinyl) sebacate,
Di(1-methacryloyl-2,2,6,6-tetramethyl-4-piperidinyl) adipate,
Di(1-acryloyl-2,2,6,6-tetramethyl-4-piperidinyl) succinate,
Di(1-crotonoyl-2,2,6,6-tetramethyl-4-piperidinyl) phthalate,
N-(1-acryloyl-2,2,6,6-tetramethyl-4-piperidinyl)-acetamide,
N-(1-acryloyl-2,2,6,6-tetramethyl-4-piperidinyl)-N-butylbenzamide,
N,N'-di(1-methyacryloyl-2,2,6,6-tetramethyl-4-piperidinyl)-N,N'-dicyclohexylisophthalamide,
1-(2-acryloyloxyethyl)-4-acryloyloxy-2,2,6,6-tetramethylpiperidine, 1-(2-methacryloyloxyethyl)-4-methacryloyloxy-2,2,6,6-tetramethylpiperidine and 1-(2-acryloyloxypropyl)-4-acryloyloxy-2,2,6,6-tetramethylpiperidine.

Examples of compounds of the formula II are:

N-(2,2,6,6-tetramethyl-4-piperidinyl)-maleimide,

N-(1,2,2,6,6-pentamethyl-4-piperidinyl)-maleimide,

N-(1-benzyl-2,2,6,6-tetramethyl-4-piperidinyl)-maleimide and

N-(1-acetyl-2,2,6,6-tetramethyl-4-piperidinyl)-maleimide.

However, the unsaturated derivatives of sterically hindered amines, which derivatives can be used according to the invention, are by no means restricted to compounds of the formulae I and II. In principle, it is possible to use any unsaturated derivative of a sterically hindered amine, provided that it is capable of undergoing copolymerization with the elastomer component.

The unsaturated sterically hindered amine can be copolymerized alone or together with other unsaturated compounds. Examples of such copolymers are alkyl acrylates, alkyl methacrylates, acrylamides and methacrylamides, acrylonitrile or methacrylonitrile.

The mixture of styrene or a-methylstyrene and the comonomer can be grafted, together with the unsaturated derivative of a sterically hindered amine, onto the elastomer particles. The graft copolymerization is preferably carried out in two steps. In the first step, the unsaturated sterically hindered amine is grafted, alone or together with other unsaturated compounds, onto the elastomer. In a second step, the mixture of styrene or a-methylstyrene and the comonomer is then grafted on.

Alternatively, the elastomer particles grafted with the unsaturated sterically hindered amine can be mixed with a separately prepared styrene or a-methylstyrene copolymer in a second step. Preferably, however, the styrene phase is grafted onto the modified elastomer.

The copolymerization or graft copolymerization is carried out by the processes customary for this purpose. It is preferably carried out in emulsion. The emulsifiers used are preferably anionic surfactants, for example alkali metal sulfonates or alkali metal resinates. The particle size of the polymer can be controlled via the amount and the metering of the surfactant. Water-soluble free radical initiators, for example potassium persulfate, are preferaby used as polymerization initiators for the preparation of the elastomer phase. For the polymerization of the styrene phase, redox initiators, for example the system iron(II) salt/organic peroxide, are preferably used. Both stages of the polymerization are preferably carried out at below 100° C., in particular at 40°-70° C. The copolymer can be isolated, for example, by coagulation or by spray drying. Coagulation of the emulsion can be achieved by adding water-soluble salts, by increasing the temperature, by reducing the pH or by freezing.

Using this method, it is possible to prepare copolymers having a very low or very high content of sterically hindered amine. Since the amine is chemically bonded to the elastomer, it cannot be lost through migration or elution. Copolymers which contain 0.1 to 20% by weight, preferably 0.1 to 10% by weight, of sterically hindered amine are preferred.

Other, known stabilizers may also be added to the copolymers thus stabilized. Examples of these are the following classes of stabilizers:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol.

1.2. Alkylated hydroquinones, for example 2,6-di-tert-butyl-4-methoxyp-2,6-diphenyl-4-octadecyloxyphenol.

1.3. Hydroxylated thiodiphenyl ethers, for example 2,2'-thiobis-(6-tert-butyl-4-methylphenol), 2,2'-thiobis-(4-octylphenol), 4,4'-thiobis-(6-tert-butyl-3-methylphenol) and 4,4'-thiobis-(6-tert-butyl-2-methylphenol).

1.4. Alkylidenebisphenols, for example 2,2'-methylenebis-(6-tert-butyl-4-methylphenol), 2,2'-methylenebis-(6-tert-butyl-4-ethylphenol), 2,2'-methylenebis-[4-methyl-6-(a-methylcyclohexyl)-phenol], 2,2'-methylenebis-(4-methyl-6-cyclohexylphenol), 2,2'-methylenebis-(6-nonyl-4-methylphenol), 2,2'-methylenebis-(4,6-di-tert-butylphenol), 2,2'-ethylidenebis-(4,6-di-tert-butylphenol), 2,2'-ethylidenebis-(6-tert-butyl-4-isobutylphenol), 2,2'-methylenebis-[6-(a-methylbenzyl)-4-nonylphenol], 2,2'-methylenebis-[6-(a,a-dimethylbenzyl)-4-nonylphenol], 4,4'-methylenebis-(2,6-di-tert-butylphenol), 4,4'-methylenebis-(6-tert-butyl-2-methylphenol), 1,1-bis-(5-tert-butyl-4-hydroxy-2-methylphenyl)-butane, 2,6-bis-(3-tert-butyl-5-methyl-2-hydroxybenzyl)-4-methylphenol, 1,1,3-tris-(5-tert-butyl-4-hydroxy-2-methylphenyl)-butane, 1,1-bis-(5-tert-butyl-4-hydroxy-2-methylphenyl)-3-n-dodecylmercaptobutane, ethylene glycol bis-[3,3-bis-(3'-tert-butyl-4'-hydroxyphenyl)-butyrate], bis-(3-tert-butyl-4-hydroxy-5-methylphenyl)-dicyclopentadiene and bis-[2-(3'-tert-butyl-2'-hydroxy-5'-methylbenzyl)-6-tert-butyl-4-methylphenyl] terephthalate.

1.5. Benzyl compounds, for example 1,3,5-tris-(3,5-di-tert-butyl-4-hydroxybenzyl)-2,4,6-trimethylbenzene, bis-(3,5-di-tert-butyl-4-hydroxybenzyl) sulfide, isooctyl 3,5-di-tert-butyl-4-hydroxybenzylmercaptoacetate, bis-(4-tert-butyl-3-hydroxy-2,6-dimethylbenzyl) dithiolterephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, dioctadecyl 3,5-di-tert-butyl-4-hydroxybenzylphosphonate, the Ca salt of monoethyl 3,5-di-tert-butyl-4-hydroxybenzylphosphonate and 1,3,5-tris-(3,5-dicyclohexyl-4-hydroxybenzyl) isocyanurate.

1.6. Acylaminophenols, for example 4-hydroxylauric acid anilide, 4-hydroxystearic acid anilide, 2,4-bis-(octylmercapto)-6-(3,5-di-tert-butyl-4-hydroxyanilino)-s-triazine and octyl N-(3,5-di-tert-butyl-4-hydroxyphenyl)carbamate.

1.7. Esters of β-(3,5-di-tert-butyl-4-hydroxyphenyl)-propionic acid with monohydric or polyhydric alcohols, for example with methanol, octadecanol, 1,6-hexanediol, neopentyl glycol, thiodiethylene'glycol, diethylene glycol, triethylene glycol, pentaerythritol, tris-(hydroxyethyl) isocyanurate and N,N'-bis-(hydroxyethyl)-oxalic acid diamide.

1.8. Esters of β-(5-tert-butyl-4-hydroxy-3-methylphenyl)-propionic acid with monohydric or polyhydric alcohols, for example with methanol, octadecanol, 1,6-hexanediol, neopentyl glycol, thiodiethylene'glycol, diethylene glycol, triethylene glycol, pentaerythritol, tris-(hydroxyethyl) isocyanurate and N,N'-bis-(hydroxyethyl)-oxalic acid diamide.

1.9. Esters of β-(3,5-dicyclohexyl-4-hydroxyphenyl)-propionic acid with monohydric or polyhydric alcohols, for example with methanol, octadecanol, 1,6-hexanediol, neopentyl glycol, thiodiethyleneglycol, diethylene glycol, triethylene glycol, pentaerythritol, tris-(hydroxy'ethyl isocyanurate and N,N'-bis-(hydroxyethyl)-oxalic acid diamide.

1.10 Amides of β-(3,5-di-tert-butyl-4-hydroxyphenyl)-propionic acid, for example N,N'-bis-(3,5-di-tert-butyl-4-hydroxyphenylpropionyl)-hexamethylenediamine, N,N'-bis-(3,5-di-tert-butyl-4-hydroxyphenylpropionyl)-trimethylenediamine and N,N'-bis-(3,5-di-tert-butyl-4-hydroxyphenylpropionyl)-hydrazine.

2. UV absorbers and light stabilizers 2.1. 2-(2'-hydroxyphenyl)-benzotriazoles, for example the 5'-methyl, 3',5,'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octyloxy, 3',5'-di-tert-amyl or 3',5'-bis-(a,a-dimethylbenzyl) derivative.

2.2. 2-hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butylphenyl salicylate, phenyl salicylate, octylphenyl salicylate, dibenzoylresorcinol, bis-(4-tert-butylbenzoyl)-resorcinol, benzoylresorcinol, 2,4-di-tert-butyl-phenyl 3,5-di-tert-butyl-4-hydroxybenzoate or hexadecyl 3,5-di-tert-butylhydroxybenzoate.

2.4. Acrylates, for example ethyl or isooctyl a-cyano-β,β-diphenylacrylate, methyl a-carbomethoxycinnamate, methyl or butyl a-cyano-β-methyl-p-methoxycinnamate, methyl a-carbomethoxy-p-methoxycinnamate or N-(β-carbomethoxy-β-cyanovinyl)-2-methylindoline.

2.5. Nickel compounds, for example nickel complexes of 2,2'-thiobis-[4-(1,1,3,3-tetreamethylbutyl)-phenol],such as the 1:1 or the 1:2 complex, if desired with additional ligands, such as n-butylamine, triethanolamine or N-cyclohexyldiethanolamine, nickel dibutyldithiocarbamate, nickel salts of monoalkyl esters of 4-hydroxy-3,5-di-tert-butylbenzylphosphonic acid, for example of the methyl or ethyl ester, nickel complexes of ketoximes, for example of 2-hydroxy-4-methylphenylundecyl ketoxime and nickel complexes of 1-phenyl-4-lauroyl-5-hydroxprazole, if desired with additional ligands.

2.6. Oxalic acid diamides, for example 4,4'-dioctyloxyoxanilide, 2,2'-dioctyloxy-5,5'-di-tert-butyl-oxanilide, 2,2'-didodecyloxy-5,5'-di-tertbutyloxanilide, 2-ethoxy-2'-ethyloxanilide, N,N'-bis-(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide, and mixtures of o- and p-methoxy- and of o- and p-ethoxy-disubstituted oxanilides.

2.7. 2-(2-hydroxyphenyl)-1,3,5-triazines, for example 2,4,6-tris-(2-hydroxy-4octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis-(2-hydroxy-4-propoxyphenyl)-6-(2,4-dimethylphenyl)-1,3,5-triazine, 2-(2-hydroxy-4-propoxyphenyl)-6-(2,4-dimethylphenyl)-1,3,5-triazine, 2-(2-hydroxy-4-octyloxyphenyl)-4,6-bis-(4-methylphenyl)-1,3,5-triazine and 2-(2-hydroxy-4-dodecyloxyphenyl)-4,6-bis-(2,4-dimethylphenyl)-1,3,5-triazine.

3. Metal deactivators, for example N,N'-diphenyloxalic acid diamide, N-salicylal-N'-salicyloylhydrazine, N,N'-bis-(salicyloyl)-hydrazine, N,N'-bis-(3,5-di-tert-butyl-4-hydroxyphenylpropionyl)-hydrazine, 3-salicyloylamino-1,2,4-triazole and bis-(benzylidene)-oxalic acid dihydrazide.

4. Phosphites and phosphonites, for example triphenyl phosphite, diphenyl alkyl phosphites, phenyl dialkyl phosphites, tris-(nonylphenyl) phosphite, trilauryl phosphite, trioctadecyl phosphite, distearyl pentaerythritol diphosphite, tris-(2,4-di-tert-butylphenyl) phosphite, diisodecyl pentaerythritol diphosphite, bis-(2,4-di-(2,4-di-tert-butylphenyl) pentaerythritol diphosphite, tristearyl sorbitol triphosphite, tetrakis-(2,4-di-tert-butylphenyl) 4,4'-biphenylene diphosphonite and 3,9-bis-(2,4-di-tert-butylphenoxy)-2,4,8,10-tetraoxa-3,9-diphosphaspiro[5.5]undecane.

5. Peroxide-destroying compounds, for example esters of β-thiodipropionic acid, for example the lauryl, stearyl, myristyl or tridecyl esters, mercaptobenzimidazole, the zinc salt of 2-mercaptobenzimidazole, zinc di-butyl dithiocarbamate, dioctadecyl disulfide and pentaerythritol tetrakis-(β-dodecylmercapto)-propionate.

The concomitant use of UV absorbers, of phenolic antioxidants and of phosphites or phosphonites is of particular importance.

It is also possible to add other auxiliaries conventionally used in plastics technology, for example pigments, fillers, reinforcing agents, lubricants, flameproofing agents, antistatic agents or blowing agents.

The Examples which follow describe the invention in more detail without there being any intention to restrict it to the Examples. In the Examples, parts are parts by weight and % is % by weight, unless stated otherwise.

EXAMPLE 1

260 g of a polybutadiene latex having a solid content of 59% (Baygal ® 2004 D) are diluted with 800 ml of water in a 4 l stirred vessel, under nitrogen. To prepare initiator 1, 500 mg of FeSO$_4$.7H$_2$O are dissolved in 50 ml of water under nitrogen, and 5.9 ml of this solution are added to 17.9 ml of a 10% Na$_4$P$_2$O$_7$ solution. After the mixture has been stirred for 15 minutes, it is diluted with 17 ml of water and this solution is added to the stirred latex. Directly thereafter, 10 g of a mixture of 1,2,2,6,6-pentamethyl-4-acryloylpiperidine (PMAP), 0.3 g of cumene hydroperoxide and 0.2 g of tert-dodecyl mercaptan are added. The mixture is heated to 50° C. and stirred for 3 hours at this temperature at a speed of about 50 revolutions per minute. An aqueous emulsifier solution, which is prepared from 20 ml of a 10% solution of potassium rosinate (Dresinate ® 731, Hercules Inc.), 2 ml of 10% NaOH solution, 5 ml of a 10% glucose solution and 1.2 ml of a 10% solution of sodium alkylnaphthalenesulfonate (Tamol ® NN), is then added. Initiator 2 is then prepared by dissolving 500 mg of FeSO$_4$.7H$_2$O in 50 ml of water under nitrogen, adding 12 ml of this solution to 36 ml of a 10% Na$_4$P$_2$O$_7$ solution, stirring for 15 minutes and then diluting with 70 ml of water, and adding this solution, obtained in this manner, to the latex. Thereafter, 300 g of styrene, 150 g of acrylonitrile, 3 g of cumene peroxide and 3 g of tert-dodecylmercaptan are added and stirring is carried out for 5 hours at 50° C. at a speed of about 50 revolutions/- minute. All these operations are carried out in the absence of oxygen.

For working up, 10 ml of a 20% aqueous emulsion of a phenolic antioxidant (Irganox ® 1076, Ciba-Geigy) are added, residual monomers are removed by passing a stream of nitrogen through, the latex is filtered over glass wool and the emulsion is coagulated by adding 100 ml of a precipitating agent consisting of a solution of 200 g of $MgSO_4.7H_2O$ and 100 g of acetic acid in 1,800 ml of water. To complete the coagulation, stirring is carried out for 1 hour at 95° C. at a speed of 500 revolutions/minute. The precipitated polymer granules are filtered off while hot, washed with 10 ml of water and dried in vacuo at 60° C. until the weight remains constant. 420 g of a white granular powder are obtained.

ABS polymers having different added amounts of PMAP are prepared in an analogous manner, the ratio of initiator component 1 to the cumene analogous manner, the ratio of initiator component 1 to the cumene peroxide/dodecylmercaptan present in the PMAP being kept constant.

The polymers obtained are mixed with 1% of magnesium stearate, 1% of a lubricant (Irgawax ® 280), and 0.2% of a phenolic antioxidant (Irganox ® 1076) on a 2-roll mill for 5 minutes at 180° C. The mixtures obtained are pressed in a hot press at 180° C. to give 2 mm thick sheets. Test specimens measuring 10×20×2 mm are cut out from the sheets. These panels are exposed to UV light in a Xenotest 450 test apparatus. Samples are taken at regular intervals and their flexural impact strength is measured according to method ASTM D 4508-85. In this measurement, the pendulum strikes the exposed side of the sample. The Table below shows the energy required to break the sample. The higher this value, the higher the flexural impact strength of the sample. In the case of undamaged samples, there is no breakage.

TABLE 1

| Content of PMAP | Flexural impact strength in $kJ/m^2$ | | | |
|---|---|---|---|---|
| | after 48 | 96 | 172 | 250 h in Xenotest |
| 0% | 23 | 20 | 17 | 17 |
| 1.6% | N.B. | N.B. | 18 | 17 |
| 4.0% | N.B. | N.B. | N.B. | 17 |
| 7.6% | N.B. | N.B. | N.B. | N.B. |

N.B. = No breakage
PMAP = 1,2,2,6,6-pentamethyl-4-acryloyloxypiperidine

EXAMPLE 2

The procedure described in Example 1 is followed, except that an alkyl acrylate is added as comonomer, simultaneously with the PMAP.

| Stabilizer | Comonomer |
|---|---|
| 2a 10 g of PMAP = 1.5% | 40 g of butyl acrylate = 6% |
| 2b 20 g of PMAP = 3% | 30 g of butyl acrylate = 4.5% |
| 2c 20 g of PMAP = 2.9% | 60 g of butyl acrylate = 8.7% |
| 2d 10 g of PMAP = 1.5% | 40 g of dodecyl acrylate = 6% |

Test panels measuring 10×20×2 mm are produced from the resulting ABS polymers, as described in Example 1, and are exposed in a Xenotest 450 test apparatus and the flexural impact strength measured. The results are shown in Table 2.

TABLE 2

| Polymer | Content of PMAP | Flexural impact strength in $kJ/m^2$ | | | |
|---|---|---|---|---|---|
| | | after 48 | 96 | 172 | 250 h Xenotes |
| 2a | 1.5% | | | | |
| 2b | 3% | N.B. | N.B. | | |
| 2c | 2.9% | N.B. | N.B. | N.B. | N.B. |
| 2d | 1.5% | N.B. | N.B. | N.B. | N.B. |

N.B. = No breakage

EXAMPLE 3

The procedure described in Example 1 is followed, except that, instead of PMAP, the following piperidine compounds are grafted onto the polybutadiene:
3a  1,2,2,6,6-pentamethyl-4-methylacryloyloxypiperidine
3b  1,2,2,6,6-pentamethyl-4-(N-butyl)-acrylamidopiperidine
3c  1-acetyl-2,2,6,6-tetramethyl-4-acryloyloxypiperidine The amount of piperidine compound corresponds to 4.5%, relative to the ABS polymer.

The flexural impact strength of the ABS polymers obtained is measured as described in Example 1.

TABLE 3

| Polymer | Flexural impact strength in $kJ/m^2$ | | | |
|---|---|---|---|---|
| | after 48 | 96 | 172 | 250 h in Xenotest |
| 3a | N.B. | N.B. | N.B. | N.B. |
| 3b | N.B. | N.B. | N.B. | 19 |
| 3c | N.B. | N.B. | 19 | 15 |

EXAMPLE 4

150 g of deionized water, 10 g of a 10% aqueous potassium rosinate solution, 0.1 g of potassium hydroxide, 0.3 g of potassium persulfate, 0.2 g of tert-dodecylmercaptan, 2 g of 1,2,2,6,6-pentamethyl-4-acryloyloxypiperidine and 100 g of butadiene are introduced, under nitrogen, into a 1 l stirred autoclave. Polymerization is carried out at 55°-65° C. at a stirring speed of 50 revolutions/minute until a conversion of 30-40% is reached, after which 30 g of deionized water, 10 g of 10% aqueous potassium rosinate and 2 g of 1,2,2,6,6-pentamethyl-4-acryloyloxypiperidine are added under nitrogen and polymerization is carried out for 3 days at 55° C. Thereafter, the unpolymerized butadiene is removed by passing through a stream of nitrogen, and 380 ml of deionized water, 6 ml of 10% aqueous potassium rosinate, 6 ml of 10% aqueous benzenesulfonic acid, 15 ml of 10% aqueous glucose and 6 ml of 10% aqueous sodium hydroxide are added to the polybutadiene latex thus obtained. To prepare initiator 2, 500 mg of $FeSO_4.7H_2O$ are dissolved in 50 ml of water under nitrogen, and 5.9 ml of this solution are added to 17.9 ml of a 10% aqueous $Na_4P_2O_7$ solution. After the mixture has been stirred for 15 minutes, it is diluted with 17 ml of water and this solution is added to the polybutadiene latex. Directly thereafter, a mixture of 150 g of styrene, 75 mg of acrylonitrile, 1.5 g of cumene hydroperoxide and 1.5 g of tert-dodecylmercaptan is added and polymerization is carried out for 6 hours at a stirring speed of 70 revolutions per minute and at 50° C. For working up, the procedure described in Example 1 is followed. 275 g of a white powder are obtained.

What is claimed is:

1. A light stabilized copolymer of styrene or α-methylstyrene and at least one comonomer, the copolymer comprising core particles which contain a crosslinked elastomer modified by first grafting an unsaturated derivative of 2,2,6,6-tetramethylpiperidine thereon and then grafting the styrene and comonomer thereon.

2. A copolymer according to claim 1, which is a graft copolymer of styrene or α-methylstyrene and at least one comonomer on the modified crosslinked elastomer.

3. A copolymer according to claim 1, wherein the comonomer is acrylonitrile.

4. A copolymer according to claim 1, wherein the comonomer is methyl methacrylate.

5. A copolymer according to claim 1, wherein the elastomer particles consist of a graft copolymer of an unsaturated derivative of a 2,2,6,6-tetramethylpiperidine on a crosslinked elastomer.

6. A copolymer according to claim 1, wherein the elastomer is polybutadiene.

7. A copolymer according to claim 1, wherein the unsaturated derivative of tetramethylpiperidine is a compound of the formula I

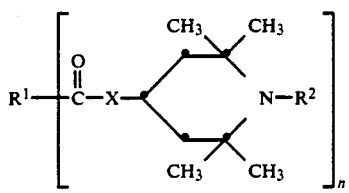

in which n is 1 or 2 and X is —O— or —N(R$^3$)—,

R$^1$, where n=1, is $C_1$-$C_{18}$alkyl, $C_2$-$C_5$alkenyl, $C_5$-$C_8$cycloalkyl, $C_7$-$C_9$-phenylalkyl, phenyl, phenyl which is substituted by halogen, $C_1$-$C_4$alkyl or $C_1$-$C_4$alkoxy, or a group R$^4$OOC—CH=CH— or, where n=2, $C_2$-$C_{10}$alkylene, vinylene, $C_6$-$C_{12}$arylene or cyclohexylene, R$^2$ is hydrogen, $C_1$-$C_{12}$alkyl, $C_3$-$C_5$alkenyl, $C_7$-$C_9$-phenylalkyl, $C_2$-$C_{10}$alkanoyl, $C_3$-$C_6$alkenoyl or a group of the formula III

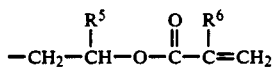

R$^3$ is hydrogen, $C_1$-$C_{12}$alkyl or $C_5$-$C_8$cycloalkyl,
R$^4$ is hydrogen or $C_1$-$C_{12}$alkyl,
R$^5$ is hydrogen, CH$_3$ or CN and
R$^6$ is hydrogen, $C_1$-$C_{12}$alkyl or phenyl,
at least one of the substituents R$^1$ and R$^2$ containing an ethylenic double bond.

8. A copolymer according to claim 7, wherein the unsaturated tetramethylpiperidine derivative is 1,2,2,6,6-pentamethyl-4-acryloyloxypiperidine.

9. A copolymer according to claim 1, wherein the unsaturated tetramethylpiperidine derivative is a compound of the formula II

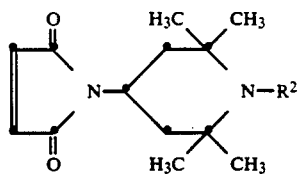

in which R$^2$ is hydroge, $C_1$-$C_{12}$alkyl, $C_3$-$C_5$alkenyl, $C_7$-$C_9$phenylalkyl or $C_2$-$C_{10}$alkanoyl.

10. A copolymer according to claim 1, wherein the unsaturated tetramethylpiperidine derivative is a compound of the formula I, where n is 1, X is —O—, R$^1$ is $C_2$-$C_5$alkenyl and R$^2$ is hydrogen, $C_1$-$C_4$alkyl, allyl, benzyl or acetyl.

11. A copolymer according to claim 1, wherein the unsaturated tetramethylpiperidine derivative is a compound of the formula I, where n is 1 or 2, X is —O—, R$^1$, where n=1, is $C_1$-$C_{18}$alkyl, cyclohexyl or phenyl and, where n=2, is $C_2$-$C_8$alkylene, and R$^2$ is $C_3$-$C_6$alkenoyl.

12. A copolymer according to claim 1, wherein the unsaturated tetramethylpiperidine derivative is a compound of the formula I, where n is 1, X is —O—, R$^1$ is $C_2$-$C_5$alkenyl and R$^2$ is a group of the formula III, where R$^5$ and R$^6$ are hydrogen or CH$_3$.

13. A copolymer according to claim 1, containing 0.1 to 10% by weight of a 2,2,6,6-tetramethylpiperidine in copolymerized form.

14. A process for the preparation of a light-stabilized styrene or α-methylstyrene copolymer by grafting a mixture of styrene or α-methylstyrene and at least one comonomer onto a crosslinked copolymer of an elastomer with an unsaturated derivative of a 2,2,6,6-tetramethylpiperidine.

15. A process according to claim 14, wherein, in a first step, the unsaturated derivative of a 2,2,6,6-tetramethylpiperidine is grafted onto the elastomer and, in a second step, a mixture of styrene or α-methylstyrene and at least one comonomer is grafted on.

16. A process according to claim 14, wherein polybutadiene is used as the elastomer.

17. A process according to claim 15, wherein both process steps are carried out in emulsion.

18. A process according to claim 15, wherein, in the first step, a mixture of an unsaturated derivative of a 2,2,6,6-tetramethylpiperidine and an alkyl acrylate is grafted onto the elastomer.

19. A process according to claim 15, wherein, in the second step, a mixture of styrene and acrylonitrile or methyl methacrylate is grafted on.

* * * * *